Patented June 5, 1951

2,555,385

UNITED STATES PATENT OFFICE 2,555,385

METAL POLYLACTYLLACTATE POLYMERS

Paul D. Watson, Arlington, Va., assignor to the United States of America as represented by the Secretary of Agriculture No Drawing. Application June 20, 1947, Serial No. 756,080

10 Claims. (Cl. 260—78.3)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the preparation of novel polymers which are derived almost wholly from lactic acid (about 95 to over 99 per cent). Other practical lactic acid polymers which have been made heretofore have utilized considerably less lactic acid in their composition. I have discovered that excellent, tough, water-resistant polymers suitable for decorative and protective coatings and other purposes can be made from the polylactyllactates of certain metals.

Whey, a byproduct of the dairy industry, is a large potential source of lactic acid, and one of the objects of this invention is the commercial utilization of large quantities of this byproduct.

Another object of this invention is to provide polymers, suitable for use as a coating material, which do not require oils or other components, such as improted natural gums and resins, which are generally in scarce supply in times of war.

A further object of this invention is to provide new and useful metallic polylactyllactate polymers.

According to the invention, a process for preparing a metal polylactyllactate having a metal content of from 0.25 to 6%, and wherein the metal has a valence exceeding 1, is provided. The process, in general, comprises heating a composition, the reactive components of which consist of (A) a salt of a metal having a valence exceeding 1 and substantially soluble in the composition, and (B) a material selected from the group consisting of polylactyllactic acid and aqueous lactic acid, said components being present in the proportion, by weight, of substantially 1 part of the salt to an amount of the material of group B equivalent, on a lactic acid bases, to from 14.7 to 252 parts of 85% lactic acid, at a temperature substantially within the range of from 150° C. to 270° C. and at a pressure substantially within the range of from 13 mm. to atmospheric pressure, at temperatures exceeding 180° C. atmospheric pressure being employed, that is, atmospheric pressure may be used at any temperature within the range recited but under reduced pressure a temperature below 180° C. can only be used. As a result of the process, a metal polylactyllactate having a content of from 0.25 to 6% of the said metal, is produced.

I have found that the resulting polymers which are suitable for coatings and other purposes, may be made from the polylactyllactates of various metals having a valence exceeding 1, such as aluminum, chromium, cobalt, copper, iron, lead, manganese, thorium, tin, titanium, zinc, and combinations of these metals. Theoretically, any polyvalent metal forming a reasonably soluble salt may be used. From a practical point of view, however, the cost should not be too high. Certain metals, such as calcium, form brittle polymers with low water resistance. Such polymers may have specific uses, but, in general, they would not be as useful as those which are hard and tough and which have a high water resistance.

The metal content of the polymers usually ranges from about 0.25 per cent to about 6 per cent. The percentage of metal in each polymer is governed somewhat by the amount that it is possible to react with the polylactylic (polylactyllactic) acids which are linear condensation products of lactic acid. Several per cent of such metals as aluminum and tin may be reacted with the polylactylic acid.

The polymers are made by reacting soluble salts of the metals, such as carbonates, chlorides, and lactates, or first dissolving the metal itself in lactic acid if somewhat soluble, as in the case of iron and zinc. Less than one per cent of some metals is present in the final polymers due to their low solubility in or limited reactivity with polylactylic acid. The metallic salts are most readily dissolved in hot lactic acid of various concentrations up to about 85 per cent. The solution may then be dehydrated by further heating under atmospheric or reduced pressure, or under atmospheric pressure by the use of water entraining agents, such as xylene, cymene, and petroleum solvents boiling approximately in the range 160° to 200° C. Fractional percentages of some metals are sufficient to react with the polylactylic acid chains and impart useful properties to the polymers. Larger amounts of other metals may be incorporated by using their more soluble and reactive chlorides. Excessive percentages of a metal (above 5 to 10 per cent) in the polymers may cause brittleness and increase the infusibility.

Two molecules of lactic acid, when heated, decompose to from one molecule of lactyllactic acid and to free one molecule of water. Chain polylactyllactic acids are then formed by interesterification with the successive loss of water between the carboxyl and alcohol groups, and react with the metal salts present to form the polylactyllactates. The formula for chromium polylactyllactate, for example, may be shown as follows:

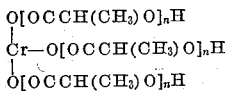

This indicates that these linear chains are joined at the carboxyl end groups by one chromium atom with a valence of three. This polymer sometimes jells during the heating process and is thermosetting. The tendency to become insoluble and infusible on further heating is typical of the behavior of the usual three-dimensional condensation polymer.

Such a polymer containing 0.86 per cent of chromium was prepared by the addition of chromic lactate to lactic acid. Upon polymerizing for 16 hours at a temperature of 190° C., it became tough, infusible, water-resistant, and rather insoluble in the common solvents. The development of a three-dimensional network structure is possibly facilitated by the formation of complexes by means of ether linkages between alcohol end groups, oxygen linkages between the metal atoms, or steric effects.

The average number of repeating units ($n$) in each chain may be computed from the percentage of chromium or other metal present by a formula and substituting the proper molecular weights. The formula for the polymer containing 0.86 per cent chromium is given below:

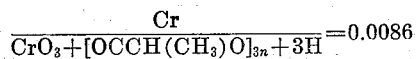

Upon solving the equation, $n$ equals 28 units per chain or 84 units per molecule. The average molecular weight, calculated on the basis of 84 repeating units per molecule, is about 6,000. This value is consistent with the properties of this polymer. It was assumed in this calculation that the polylactylic acid was fully reacted with the metal. However, this assumption is not always correct according to fractionation experiments and acid number determinations, but is nearly so.

Experiments have shown that, generally, thermosetting polymers are produced when polylactyllactates are made with metals which have a valence exceeding 2, such as aluminum, chromium, and manganese. However, the polymers obtained with metals having a valence of two, such as copper, lead, and zinc, are thermoplastic type polymers of the linear condensation type, with a melting point generally between 80° and 100° C. Therefore, coatings may be thermoplastic or thermosetting, as desired, depending upon the valence of the metal in the polylactyllactate. The thermosetting type of coating is more likely to be tougher and more solvent-resistant than the thermoplastic type of coating.

I have found that the metallic polylactyllactate polymers may be prepared by reacting the components together by several methods that are described below:

(1) Polymerizing under reduced pressure at temperatures between 150° and 180° C. for about 10 hours; (2) polymerizing, after removal of water, in layers about one quarter inch thick in shallow vessels at a temperature of about 185° C. for approximately 16 hours; (3) polymerizing in an open vessel with rapid stirring at a temperature of about 200° C., after removal of water, and gradually raising it to about 250° to 260° C. for 3 to 5 hours, preferably with the passage of an inert gas, such as carbon dioxide, through the polymer; (4) polymerizing by the addition of a reactive anhydrous metallic chloride to polylactylic acid in the presence of a mutual organic solvent at room temperature or at the boiling temperature of the solvent (below 150° C.) for about 1 to 3 hours or until evolution of hydrochloric acid gas has ceased.

When a reactive anhydrous metallic chloride, e. g., aluminum chloride, is used as the reactant, it should be added slowly to polylactylic acid of about 120 per cent concentration (calculated as lactic acid) which has been previously dissolved in a chlorinated solvent, such as ethylene dichloride, chloroform, methylene chloride, monochlorobenzene, and tetrachlorethane. Xylol or acetone may also be used. However, experiments have shown that benzene and certain other solvents result in soft, fusible resins being obtained. Evidently the type of diluent used is a factor in the amount of aluminum which reacts with the polylactylic acid. An amount of anhydrous aluminum chloride equivalent to about 5 per cent to 20 per cent of the weight of the polylactylic acid is required, depending upon the properties desired in the product. The reaction can take place without the application of heat, but heating speeds up the process. After about a period of 1 to 3 hours, if the reaction is rapid, the polymer may become insoluble and separate out as a gel. In the slower type of reaction, the polymer may remain in solution and can be separated from the unreacted metal residue by filtration.

This filtrate, after removal of hydrochloric acid gas, can be used directly as a lacquer, but a more infusible and stable product is obtained by curing the polymer by heating it for several hours at a temperature of about 170° C. The polymer may then be obtained as a pale, infusible solid which may be readily converted into lumps or an almost colorless powder. The yield of product based on the weight of the polylactylic acid reacted is usually over 90 per cent. This aluminum polylactyllactate makes a clear, practically colorless lacquer that dries rapidly in a few minutes and adheres well to metal and glass. Experiments have indicated that an improved product can be obtained in the presence of about 5 per cent of benzyl chloride added to the polylactylic acid solution before the addition of the aluminum chloride.

This process has the advantage of requiring very little heat, and if chlorinated solvents are used throughout for the reaction medium and as the lacquer solvent, the whole process is without fire hazards. Then, too, the pale color of the product makes it of interest as a coating for decorative uses.

Tin polylactyllactate and titanium polylactyllactate polymers may also be prepared by means of their anhydrous tetrachlorides, using chlorinated hydrocarbons as the solvent for polylactylic acid similar to the process described above for aluminum polylactyllactate. In the case of titanium, the best product was produced when about 20 per cent of titanium tetrachloride was added to the polylactylic acid.

My preferred method for the preparation of metallic polylactyllactate polymers from salts other than the very reactive anhydrous metal chlorides is to dissolve the salts in lactic acid of about 50 per cent concentration by heating at about 100° C. while stirring. The water is then removed by slowly raising the temperature to about 180° C. The mixture is rapidly stirred and carbon dioxide bubbled through the polymer while the temperature is raised to about 250° C., where it is held until a sample of the polymer when cooled hardens with little or no tackiness. Generally, the process is complete when the polymer is held for approximately 2 hours at the high temperature. Viscosity measurements during the process are of value in controlling the degree of polymerization. The yield of product by this method is generally in the neighborhood of 60 per cent, but may be increased materially by recycling the volatile byproducts of the reaction which, aside from the water, are chiefly lactic acid, lactid, and low polymers of a soft or viscous oily nature.

I have found that when acenaphthene in an amount equal to about 5 to 10 per cent by weight of the polylactylic acid present, was added at the beginning of the heat polymerization, after removal of the water, that the yield, hardness, and resistance to alkali of the metallic polylactyllactate polymers were improved. A portion of the acenaphthene was removed by sublimation during the process. Presumably, it does not react, but its presence influences the course of the polymerization.

Glass-lined vessels should be used in the process if metallic chlorides are among the reactants, but stainless steel vessels are suitable when less reactive salts are used. These vessels should be designed to allow the free escape of the volatile reaction products during the polymerization or curing of the polymers, since otherwise inferior polymers will be obtained. However, when very reactive metallic chlorides are used, a closed stirrer-equipped vessel provided with a reflux opening for the escape of hydrochloric acid gas is necessary in order to prevent loss of the solvent.

In some cases the metal may not be fully reacted in the polylactyllactate polymer, and a softer fraction containing only a trace of metal can be separated by a fractionation procedure while the polymer is dissolved in a suitable solvent. The more highly polymerized fraction becomes insoluble upon the addition of an excess of carbon tetrachloride or a light petroleum distillate and may be readily separated. This procedure is described in my U. S. Patent No. 2,189,572, granted February 6, 1940. The softer fraction may also be extracted from the powdered polymer by means of solvents in which only the lower polymers are soluble, such as carbon tetrachloride or alcohols. The more highly polymerized fraction which contains most of the metal in combination may be used to produce coatings that have improved water resistance and drying properties. The fraction containing the lower polymers can be utilized by recycling in the process or may be used in the formulation of tackifiers, plasticizers, and adhesives.

Coating solutions may be most readily prepared by adding the solvent before solidification of the polymer occurs. The polymers are generally soluble in organic solvents of the ketone, benzol, or toluol types, and also in most chlorinated hydrocarbon solvents. The coatings generally air-dry rapidly when made with volatile solvents. However, for good water resistance, the coatings should be baked for about 15 minutes or longer at a temperature of about 185° C. Some coatings formulated with chromium, iron, manganese, and thorium were found to be heat-resistant, and could be heated for hours at about 190° C. without embrittlement. Others made with aluminum, chromium, and zinc do not darken appreciably on long heating.

Numerous combinations of these mixed polymers are possible by which the properties of the coatings, such as drying, hardness, water resistance, toughness, may be varied. In this way also coatings may be formulated that have good heat stability and do not darken excessively when baked at high temperatures.

Pigmented coatings have been prepared using a blended pigment consisting of cobalt blue and titanium dioxide. These coatings were an attractive light blue color, hard, tough, glossy, and water-resistant. This coating, when baked on iron articles, such as cigarette lighters and automatic pencils, held up well for a period of eight months when the articles were used daily.

Steel panels coated with the plain polylactyllactate polymer have withstood immersion in water for many weeks without any blushing or softening.

These polymers may be used as extenders with other compatible resins, such as ethyl cellulose, vinyl chloride, naphthene (coal tar) hydrocarbon resins, substituted phenol-formaldehyde resins, and melamine-formaldehyde resins. Minor percentages of the above resins generally do not cause precipitation when added to the polylactyllactate polymers. Melamine-formaldehyde resin is especially useful for blending because the addition of about 20 per cent of this resin shortens the baking time to less than 5 minutes at 185° C. and improves the hardness and thermosetting properties of the polylactyllactate coatings. These resinous polymers may also be employed with drying oils to formulate fast air-drying and rapid-baking varnishes that are useful in coating wood and metal products.

When polymerized to a high degree, the polymers may be comminuted to give a powder that may be readily shipped, and which may be used as a constituent in moulding compositions. Alone or modified with other resins, plasticizers, and fillers, they are applicable for the purpose of treatment and sizing of paper and wood products. These polymers may also be used as sticking agents in the spraying of fungicides and insecticides, particularly as emulsions.

In the following examples, which are illustrative of this invention, the yields of the metallic polylactyllactates are calculated on the basis of the weight of the polylactylic acid actually used or which would be formed from the dilute lactic acid during the process. All parts are given by weight.

*Example 1*

*Aluminum polylactyllactate.* — One hundred parts of polylactylic acid was dissolved in four times its weight of monochlorobenzene by warming in a vessel equipped with an agitator and a reflux condenser. The condenser may be connected to an absorbing train for hydrogen chloride. A total of 10 parts of anhydrous aluminum chloride was added at intervals over a period of 1⅓ hours. The solution was cool during the first half hour and was then heated to boiling for 4½ hours. Hydrogen chloride was slowly evolved from the start, and the evolution was rapid during the heating, almost ceasing at the end. The insoluble residue was removed by filtration and the product was further polymerized by heating in an open vessel for 16 hours at 155° C. The yield of aluminum polylactyllactate was 92 per cent. It was a clear, light brown, hard, thermosetting polymer that could be ground to a pale yellow powder. This polylactyllactate contained 1.76 per cent aluminum. The polymer was soluble in acetone and methylene dichloride, but insoluble in benzene, toluene, xylol, and butyl alcohol. The polymer was dissolved in methylene dichloride and coatings made that air-dried in a few minutes. When baked for 20 minutes at 180° C., the coatings were hard and almost colorless. The coatings were unaffected by immersion in water during a five-day test.

Example 2

*Aluminum polylactyllactate.*—The process was carried out in an apparatus similar to that used in Example 1. One hundred parts of polylactylic acid was dissolved in about three times its weight of methylene chloride by warming, then ten parts of anhydrous aluminum chloride was added gradually over a period of 1½ hours, while the solution was heated to boiling. This was a relatively low temperature, as the boiling point of methylene chloride is 39.8° C. The solution was heated for an additional time of 1½ hours, when the evolution of hydrochloric acid had almost ceased. The insoluble particles containing aluminum residue not reacted with polylactyllactic acid were filtered off, and the solution was heated briefly to expel additional hydrochloric acid. The methylene chloride polymer solution was fractionated by adding about three times its volume of carbon tetrachloride and then distilling off methylene chloride until the boiling point of the mixture reached 72° C. The separation of polymer into two fractions was hastened by cooling the mixture to about 0° C. The insoluble fraction rose to the top while the less polymerized fraction remained in solution. The two layers were separated, and the solvents distilled off. The fractions were then heated for 2 hours at 160° C. It was found that the yield of the insoluble fraction containing 2.26% of aluminum was 53%, and that of the soluble fraction containing 0.21% aluminum was 31%, or a total yield of 84%.

The two fractions were each redissolved in chloroform, and coatings made up which were baked for 20 and 40 minutes at 180° C. The coatings made from the soluble, low aluminum content fraction were thermoplastic, tacky, irregular, and poor in water resistance. The coatings made from the insoluble, high aluminum content fraction were thermosetting, clear, smooth, hard, and water resistant. This coating was almost colorless and had air-drying properties. Apparently the aluminum did not react completely with the polylactylic acid, and the properties of the product were improved by the separation of that part of the polymer which contained a very low percentage of metal.

Example 3

*Copper polylacetyllactate.*—Copper lactate was added gradually to 85% lactic acid while heated to almost boiling until a small excess remained undissolved. This was separated by filtration and the solution was heated in an open vessel at a temperature of 190° C. for 16 hours. The resulting polymer was hard and fusible. It was dissolved in acetone to make a coating solution. The coating solution when spread on surfaces air-dride in about 2 hours. Some samples of the dried coatings were baked for 20 and others for 45 minutes at 190° C. In this condition they were thermoplastic and tough and had excellent hardness properties. They were also light, clear brown in color and water resistant. Two coats were baked on iron at 190° C., the first for 12 minutes and the second for 20 minutes, and were unaffected by immersion in water during a four-day test. This copper polylactyllactate polymer contained 0.25% of copper.

Example 4

*Lead polylactyllactate.*—One part of lead lactate was dissolved in 429 parts of 50% lactic acid solution, and most of the water was removed by heating with steam in an open vessel. The heating was continued with agitation for 3 hours at a temperature of 140–145° C. The polymer was then heated for 4 hours somewhat below 100° C., while under vacuum, the pressure being about 85 mm., and then the temperature was gradually raised to about 172° C. over a 1½ hour period. Heating was continued for 14½ hours at 185–190° C., with the pressure about 13 mm. The polymer was now hard and it had a clear, light brown color. The yield was 45%, calculated on the basis of the polylactyllactic acid (120 acidity as lactic acid) theoretically present before polymerization. The polylactyllactate polymer contained about 0.5% lead. A coating solution was made up by dissolving it in benzene. The coating was air-dried and when baked for 45 minutes at 185° C., almost colorless, hard, tough, and thermoplastic coatings were obtained which withstood water immersion satisfactorily over a three-day test.

Example 5

*Manganese polylactyllactate.*—One part of manganese lactate was dissolved in 50 parts of 85% lactic acid, by heating to boiling in an open vessel, equipped with a stirrer. The temperature of the solution was gradually raised from about 200° C. to 250° C. over a period of 3 hours, and then held between the temperatures of 260° and 268° C. for 1 hour. The yield of the hard brown polymer was 56% and it contained 1.16% manganese. A coating solution was made up by dissolving the polymer in hot benzene and, when tested, coatings were found to dry slowly in the air. When baked for 25, 50, and 75 minutes at 185° C., clear, light brown, hard, tough, and thermosetting coatings were obtained. They were water-resistant when immersed in water for 24 hours.

Example 6

*Thorium polylactyllactate.*—One part of thorium chloride was dissolved in 158 parts of 85% lactic acid. Most of the water was boiled off during 1¼ hours heating. The solution was then transferred to a shallow vessel and heated for 18 hours at 185° C. A 55% yield of brown, hard polymer was obtained, which contained about 1% thorium. The product was dissolved in toluene and coatings prepared which dried slowly in the air. The coating baked on iron at 185° C. for 30 minutes was light colored, tough, and water-resistant when immersed in water for 2 days. It was of the thermosetting type.

Example 7

*Tin polylactyllactate.*—One part of stannous lactate was dissolved in about 16 parts of 85% lactic acid, and the solution was heated to almost boiling in an open vessel for 1 hour in order to remove most of the water. The solution was then heated in a shallow open vessel with a large surface exposed for 22 hours at 185° C. The polymer was now viscous when hot, and upon cooling was hard and light brown in color. Analysis showed it to contain 5.8% of tin. The polymer was dissolved in hot benzene to make a coating solution. Coatings were baked at 185° C. for 20 and 25 minutes, and clear, smooth, hard, and almost colorless finishes obtained. The coatings were tough, thermosetting, and water-resistant. Two coats were baked on steel, the first for 15 minutes and the second for 20 minutes at 185° C. An almost colorless, glossy, hard coating was obtained which withstood immersion in water during a two-week test. The coatings had excellent heat resistance and could be baked for 17 hours at 185° C. without darkening or embrittlement. A porous paper impregnated with the coating solution, air-dried, and then cured for 1 minute at 185° C., was impervious to a 2-inch head of water for 6 hours.

*Example 8*

Zinc polylactyllactate.—Zinc lactate was slowly added to 85% lactic acid while heated to boiling until a small excess remained undissolved. Heating at the boiling point was continued for 1 hour, and the excess zinc salt was then filtered off. The solution was then heated in a shallow open vessel with a large surface exposed for 16 hours at 190° C. The polymer was now a brown, hard, thermoplastic solid containing 0.26% zinc. It was dissolved in a mixture of acetone and benzene to make a coating solution. Coatings prepared from this solution were air-drying. Two coats were baked on steel at 190° C., the first for 10 minutes and the second for 20 minutes. The baked coatings were light brown, hard, tough, and thermoplastic, with a high gloss, and were unaffected by immersion in water during an eleven-day test.

*Example 9*

Chromium, manganese, and zinc polylactyllactate.—Two and nine-tenth parts of chromic chloride ($CrCl_3 \cdot 6H_2O$), 8 parts of manganese chloride ($MnCl_2 \cdot 4H_2O$), and 1.1 parts of zinc carbonate ($ZnCO_3$) were dissolved in 1200 parts of 50% lactic acid. The solution was then heated in an open vessel equipped with a stirrer. The temperature was held at about 160° C. for 2½ hours in order to remove the water; and then gradually raised to 235° C. over a period of 1½ hours. The polymer was then heated for 2 hours at a temperature which varied between about 220° C. and 245° C. The product was a clear, greenish, hard solid upon cooling. The yield was 52%, and the polymer contained about 0.21% each of chromium and zinc and about 0.85% of manganese. A coating solution was prepared by dissolving the polymer in a mixture of methyl ethyl ketone and toluene. Three coats were successively baked on a piece of steel at 185° C. for 15, 20, and 30 minutes, respectively. The coating was thermosetting, had a clear, light brown color, and was hard, tough, and unchanged by immersion in water during a nine-day test.

Having thus described my invention, I claim:

1. A process for preparing a metal polylactyllactate comprising heating a composition, the reactive components of which consist of (A) a salt of a metal having a valence exceeding 1 and substantially soluble in the composition, and (B) a material selected from the group consisting of polylactyllactic acid and aqueous lactic acid, said components being present in the proportion, by weight, of substantially 1 part of the salt to an amount of the material of group B equivalent, on a lactic acid basis, to from 14.7 to 252 parts of 85% lactic acid, at a temperature substantially within the range of from 150° C. to 270° C. and at a pressure substantially within the range of from 13 mm. to atmospheric pressure, temperatures exceeding 180° C. employing atmospheric pressure, thereby to produce a metal polylactyllactate having a content of from 0.25 to 6% of the said metal.

2. The process of claim 1 wherein the heating is conducted at atmospheric pressure.

3. The process of claim 1 wherein the metal has a valence exceeding 2.

4. The process of claim 1 wherein the metal has a valence of 2.

5. The process of claim 1 wherein the salt of the metal having the valence exceeding 1 is selected from the group consisting of the carbonates, chlorides, and lactates of the said metal.

6. The process of claim 1 wherein the metallic salt is copper lactate and the proportions of the reactive components are selected to yield a copper polylactyllactate having a copper content of substantially 0.25%.

7. The process of claim 1 wherein the metallic salt is manganese lactate, the proportions of the reactive components are substantially 1 part of the manganese lactate per 50 parts of 85% lactic acid, and the manganese content of the polylactyllactate is substantially 1.16%.

8. The process of claim 1 wherein the metallic salt is stannous lactate, the proportions of the reactive components are substantially 1 part of the stannous lactate per 16 parts of 85% lactic acid, and the tin content of the polylactyllactate is substantially 6%.

9. The process of claim 1 wherein the material of group B used is aqueous lactic acid.

10. A process for preparing tin polylactyllactate comprising heating a solution of one part, by weight, of stannous lactate dissolved in 16 parts, by weight, of 85% lactic acid to almost boiling in an open vessel until most of the water has been removed and the lactic acid has been substantially converted to polylactyllactic acid, and heating the resulting solution in an open vessel at a temperature of 185° C. to produce tin polylactyllactate having a tin content of 5.8%.

PAUL D. WATSON.

REFERENCES CITED

The following references are of record in the file of this patent:

UNITED STATES PATENTS

| Number | Name | Date |
|---|---|---|
| 1,095,205 | Gruter et al. | May 5, 1914 |
| 2,088,928 | Ruben | Aug. 3, 1937 |
| 2,144,352 | Watson | Jan. 17, 1939 |
| 2,174,491 | Watson | Sept. 26, 1939 |
| 2,363,103 | Watson | Nov. 21, 1944 |

OTHER REFERENCES

Filachione et al.: Industrial and Engineering Chemistry, vol. 36, March 1943, pp. 223 to 228.